Dec. 4, 1951   W. C. ROSENBAUM   2,577,434
FLOW SYSTEM AND VALVE STRUCTURE THEREFOR
Filed Sept. 10, 1945   2 SHEETS—SHEET 1
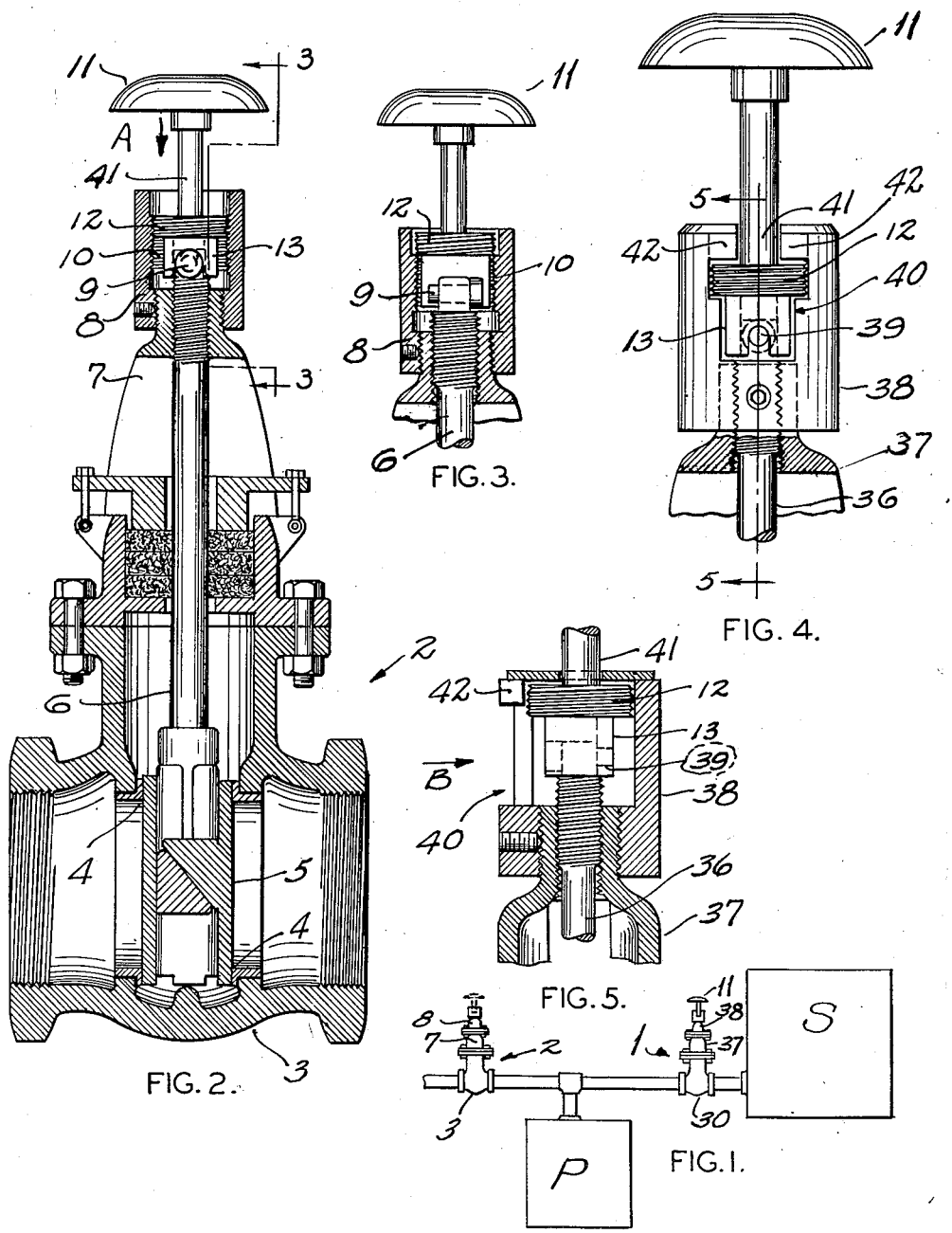
INVENTOR:
WILLIAM C. ROSENBAUM
BY
ATTORNEY Dec. 4, 1951 W. C. ROSENBAUM 2,577,434
FLOW SYSTEM AND VALVE STRUCTURE THEREFOR
Filed Sept. 10, 1945 2 SHEETS—SHEET 2

INVENTOR
WILLIAM C. ROSENBAUM
BY Rodney Bedell
ATTORNEY

Patented Dec. 4, 1951

2,577,434

UNITED STATES PATENT OFFICE 2,577,434

FLOW SYSTEM AND VALVE STRUCTURE THEREFOR

William C. Rosenbaum, Ferguson, Mo.

Application September 10, 1945, Serial No. 615,386

12 Claims. (Cl. 137—78)

The invention relates to valve structures such as are used to control flow of fluids and is particularly adapted for use in a system of fluid control where there are a plurality of valves at least two of which should be maintained in a predetermined relation to each other such as (1) one valve being opened only when another valve is closed, (2) one valve being opened only when another valve is opened, or (3) one valve being closed only when another valve is closed.

One object of the invention is to assure the maintenance of the relative positions of two or more valves, irrespective of the ignorance or carelessness of the attendant.

Another object is to insure the movement of a valve to a given position before an associated valve can be moved from a given position.

The invention may be embodied in pipe lines as used in chemical manufacturing plants, steam installations, storage systems for gasoline, on other fluids and other piping systems, and the accompanying drawings illustrate a selected embodiment of the invention showing its application to a piping arrangement used in processing a chemical mixture and in these drawings—

Figure 1 is a diagrammatic illustration of the embodiment.

Figure 2 is a section through one of the valves shown in Figure 1.

Figure 3 is a detail view taken approximately on the line 3—3 of Figure 2.

Figure 4 is a section and elevation of the other valve shown in Figure 1.

Figure 5 is a transverse section taken on the line 5—5 of Figure 4.

Figure 6:
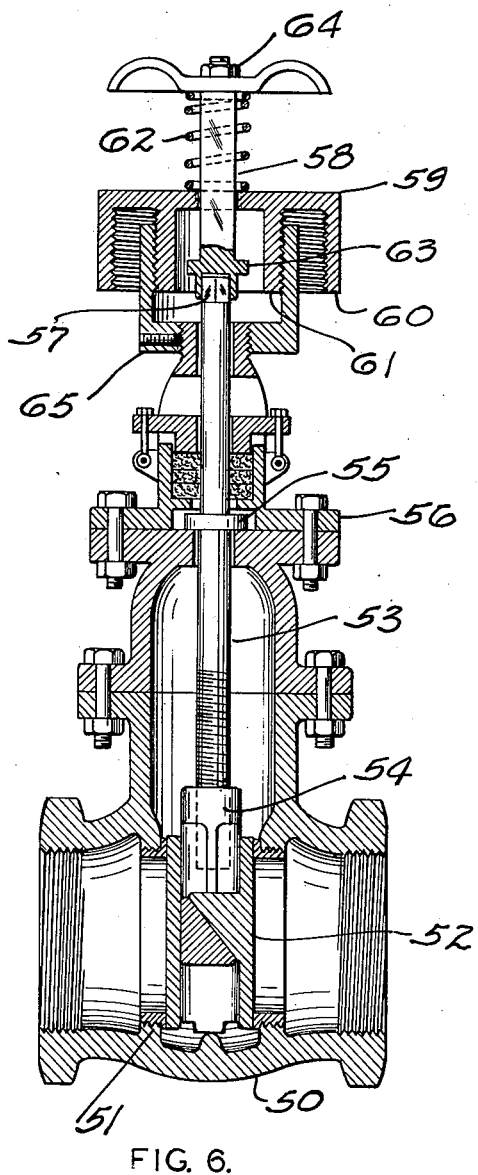
Figure 6 is a section corresponding to Figure 2 but illustrating another form of the invention and embodying a valve with a non-rising stem.

Referring to Figure 1, it may be assumed that tank S is for storage of a raw material liquid and that tank P is for processing material supplied from tank S. It may be assumed that no material should pass from tank S through valve 1 to tank P unless water is flowing to tank P through valve 2. To this end, valve 2 may be constructed as shown in Figure 2, which illustrates a well known type of valve including a body 3, having a seat 4, a disc 5, having a stem 6 threaded into an extension 7 on the valve body and adapted, when rotated, to move the disc to and from its seat to close and open the valve respectively.

In the usual construction of such valves, the stem is projected well above extension 7 and provided with a handle whereby the stem may be screwed in opposite directions to open and close the valve respectively. In the present structure, a sleeve 8 is secured to the upper end of extension 7 and valve stem 6 terminates intermediate the ends of sleeve 8 and at its upper end is provided with a pin 9. The internal diameter of sleeve 8 is substantially larger than the diameter of stem 6, and sleeve 8 is internally threaded at 10. A valve operating tool 11 has a drum-like portion 12 threaded to engage sleeve threads 10 and has a boss 13 extending downwardly from drum 12 and slotted transversely to receive the head and shank of pin 9 when the tool is moved lengthwise of the stem in the direction of arrow A (Figure 2). Obviously, this cannot be done except when the upper end of stem 6 projects above the upper end of threads 10 in sleeve 8, as indicated in Figure 3, when valve disc 5 will be raised from its seat. When tool 11 has engaged pin 9 and the valve is rotated in the right hand direction to thread stem 6 downwardly through extension 7, the threads on drum 12 will enter the threads 10 on sleeve 8 and it will be impossible to remove the tool from its engagement with stem 6 until the latter and the tool have been rotated in the opposite direction back to the position shown in Figure 3 when the valve will be open. In other words, valve 2 must be open when the handle is removed and when valve 2 is closed the handle will be held in assembled relation therewith.

The body 30 of valve 1 and its seat and disc (not shown), stem 36 and body extension 37 will be the same as the corresponding parts previously described in valve 2. A sleeve 38 will be secured to extension 37 similar to the securing of sleeve 8 to extension 7 in valve 2. Stem 36 will terminate below the upper end of sleeve 38 and, like stem 6 of valve 2, is provided with a pin 39 adapted to be engaged by the slotted lower end of tool 11 when the latter is moved transversely of the stem in the direction of the arrow B (Figure 5). To provide for such relative movement of the tool and the valve stem, sleeve 38 has a cruciform opening 40 in its side. The lower portion of the opening admits boss 13, the middle portion of the opening admits drum 12, and the upper portion of the opening admits the shank 41 of the tool. Obviously, such movement of the tool into stem-engaging position can only be effected when the stem is in its lowermost position, as indicated in Figure 4, when the valve disc at the lower end of the stem is seated to close the valve. When tool 11 has engaged pin 39 and the valve is rotated in the left hand direction to thread stem 36 upwardly through extension 37, the drum 12 will move upwardly behind lips 42 on sleeve 38 and it will be impossible to remove the tool from its engagement with stem 36 until the latter and the tool have been rotated in the opposite direction back to the position shown in Figure 4 when the valve will be closed. In other words, valve 1 must be closed when the handle is removed and when valve 1 is open the handle will be held in assembled relation therewith.

From the above description, it will be understood that in any desired lay-out of tanks and piping, the flow of material to and from different parts of the system may be correlated so that one or more valves can only be opened when one or more other valves are closed, or one or more valves can only be opened when one or more other valves are opened, or one or more valves can only be closed when one or more other valves are open. The particular combination of raw material, water and processing tank is merely an example of the desirability of such an interlocking sytem and the same principle and general structure may be applied to any piping system where the results indicated above are desired.

Figure 7:
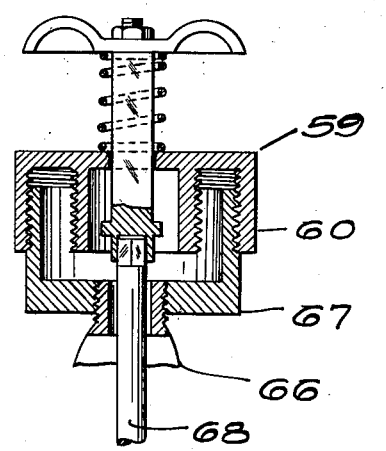
Figure 7 is a detail section through the upper portion of an associated valve of the non-rising stem type.

Figures 6 and 7 illustrate an embodiment of the invention in valves of the non-rising stem type. The valve body 50, with its seat 51 and gate 52, correspond generally to those parts shown in Figure 2. Part 53, corresponding to the stem 6 in Figure 2, is threaded through a cage 54 on gate 52 and is rotatable in valve body 50 but is held against axial movement therethrough by a collar 55 and a cap 56. Part 53 has a square upper terminal 57 arranged to be engaged by a correspondingly shaped socket on a handle 58 which is provided with a drum 59 having an annulus 60 threaded interiorly with left hand threads and an annulus 61 threaded exteriorly with right hand threads. Drum 59 is slidable longitudinally of handle 58 but is non-rotatable thereon, and to this end the handle 58 and the opening therefor in the drum may be square or splined. A spring 62 thrusts drum 59 downwardly on handle 58, but the drum and handle are maintained assembled by a collar 63 and a nut 64. The upper end of the valve body is provided with a detachable sleeve 65, the upper portion of which is provided with interior right hand threads corresponding to the threads on annulus 61.

When the handle is applied to the valve, parts 53 and 58 engage at once, but substantial rotation of the handle to the right to close the valve results in dum 59 being threaded into sleeve 65 and the handle and drum cannot thereafter be removed from the valve until the handle has been rotated in the opposite direction to thread drum 59 off of the sleeve, which rotation will result in opening the valve.

The associated valve body 66 shown in Figure 7 will have a sleeve 67 mounted on its upper end and provided with exterior left hand threads corresponding to the threads on annulus 60. When the handle is applied to the valve part 68 and rotated in the left hand direction to open the valve, drum 59 will be threaded onto sleeve 67 and the handle cannot thereafter be removed from the valve until it has first been rotated in the opposite direction to unscrew the drum and this will result in closing the valve so that the handle can only be removed from the valve when the valve is closed. This valve arrangement will produce the same general results as described above in connection with the structure shown in Figures 1–5.

The details of the controls may be varied substantially without departing from the spirit of the invention, and the exclusive use of such modifications as come within the scope of the claims is contemplated.

What is claimed is:

1. In a piping assembly, separate supply lines leading to a common discharge point characterized in that flow from one supply line to said common discharge point in advance of flow from discharge point would be detrimental, an interlocking control system for said lines comprising an individual valve for each supply line each including a body having a valve seat and a stationary threaded annulus spaced therefrom, and a valve closing member having a stem threaded into said annulus whereby the member is fed towards and away from the seat respectively when the stem is rotated in opposite directions, a handle applicable to and removable from each of the valve stems, means associated with the valve body for said one supply line cooperating with means on said handle for retaining the handle in assembled relation with the corresponding valve stem except when the corresponding closing member is seated, and means associated with the other valve body cooperating with means on said handle for retaining the handle in assembled relation with the corresponding valve stem except when the corresponding closing member is unseated.

2. In a valve assembly of the class described, a valve body having a seat and a threaded extension, a valve closing member movable towards and away from said seat and provided with a stem projecting from the valve body and threaded into said extension and rotatable to move the valve closing member as described, a sleeve on said extension surrounding the projecting portion of the stem, a handle adapted for insertion into the sleeve and to engage the stem by non-rotary movement and by which the stem may be rotated after engagement, and means coacting with the sleeve and controlled by rotary movement of the handle after its application to the stem to prevent removal of the handle from the stem by non-rotary movement except when the valve member is in a predetermined position relative to said seat.

3. In a valve assembly of the class described, a valve body having a seat and a threaded extension, a valve closing member movable towards and away from said seat and provided with a stem projecting from the valve body and threaded into said extension and rotatable to move the valve closing member as described, a sleeve on said extension surrounding the projecting portion of the stem, and a handle adapted to engage the stem by non-rotary movement and by which the stem may be rotated after engagement, and threads on said handle and sleeve engaged and disengaged by rotary movement of the handle and stem, as a unit, in opposite directions respectively.

4. In a valve assembly of the class described, a valve body having a seat and a threaded extension, a valve closing member movable towards and away from said seat and provided with a stem projecting from the valve body and threaded into said extension and rotatable to move the valve closing member as described, a sleeve surrounding said stem and provided with threads spaced from said stem, and a detachable handle comprising a portion to be grasped by the user and a portion having threads to screw into and out of said sleeve threads, and opposing means on the adjacent ends of said stem and handle engageable with each other by relative movement of the handle and stem axially of the latter when the valve closing member is spaced from its seat, the threads of said sleeve and handle portion engaging each other as the handle and stem are rotated to seat said valve closing member.

5. In a valve structure, a valve body having a seat, a valve closing part movable towards and away from said seat, a member rotatable in the valve body but held against axial movement therein and operatively connected to said part to move it towards and from the seat respectively as the member is rotated in opposite directions, a sleeve fixed on the body and threaded about the axis of said rotatable member, a detachable handle including a portion insertable in said sleeve axially of said member and arranged to non-rotatably engage said member, there being a device slidably but non-rotatably mounted on said portion and threaded to engage said sleeve when the handle is rotated in one direction, whereby the handle is secured to the body until the handle has been rotated an equal amount in the opposite direction to disengage the sleeve.

6. In a fluid handling system including at least two conduits for fluid in which the condition of flow in one conduit is required to bear a predetermined relation to the condition of flow in the other conduit in order to obtain a desired result, a plurality of controls each having a conduit closure member adapted to be screwed into and out of conduit closing position to bring about said predetermined relation, an operating handle for selective application to said members, said handle and one of said controls including elements cooperating to prevent application and removal of said handle to and from the corresponding closure member except when the control is closed and said handle and another of said controls including elements cooperating to prevent application and removal of said handle to and from the corresponding closure member except when the control is open, said cooperating elements being so designed as to prevent operation of said closure members by said handle except to produce said predetermined relationship in the conditions of flow.

7. In a fluid handling system including at least two conduits for fluid in which the condition of flow in one conduit is required to bear a predetermined relation to the condition of flow in the other conduit in order to obtain a desired result, a plurality of valves each having a body and a closure member adapted to be moved transversely of the conduit into and out of valve closing position to bring about said predetermined relation, an operating handle for selectively operating said members, said handle and one of said valves including cooperating elements preventing the application and removal of said handle to and from the corresponding closure member except when the valve is closed and said handle and another of said valves including elements preventing the application and removal of said handle to and from the corresponding closure member except when the valve is open, said cooperating elements being so designed as to prevent operation of said closure members by said handle except to produce said predetermined relationship in the conditions of flow.

8. In a valve assembly of the class described, a valve body having a seat and a threaded extension, a valve closing member movable towards and away from said seat and provided with a stem projecting from the valve body and having threads fitting said threaded extension and rotatable to move the valve closing member as described, a hollow sleeve on said extension surrounding the upper portion of said stem and provided with a lateral opening in its side having a relatively narrow part and a relatively wide part, and a detachable elongated handle comprising a portion to be grasped by the user and a portion with relatively narrow and wide sections adapted to be passed through said opening in a direction transversely of the axis of the stem to the interior of said sleeve into axial alignment with said stem, when said relatively wide and narrow sleeve parts and stem portions are opposite each other transversely of the stem, opposing elements on said stem and handle interengaged when said stem and handle are so aligned to effect rotary movement of said stem by said handle, said handle relatively wide and narrow portions being moved axially of said sleeve by said stem threads, when said stem is rotated, out of transverse opposition to said sleeve opening.

9. A fluid system including conduits leading from separate sources of fluid supply to a common delivery member characterized in that flow from one source to said common delivery member in advance of flow from said other source to said common delivery member would be detrimental, an individual control valve in each conduit between its source of supply and said delivery member, a single handle for successively operating said valves, each of said valves having a handle engaging part movable to different positions as the valve is opened and closed, means on one of said valves cooperating with the handle to provide for the application of the handle to the said valve part when the valve is in closed position and preventing removal of the handle from said valve part when the valve is in open position, and means on the other of said valves cooperating with the handle to provide for the application of the handle to said valve part when the valve is in open position and preventing removal of the handle from said valve part when the valve is in closed position.

10. In a fluid handling system including at least two fluid conduits, the system being such that in order to obtain a desired result it is essential that the flow of fluid through one conduit occurs only when the fluid in another conduit is subject to a predetermined control, a valve in each conduit comprising a valve body structure, having a valve seat, and a member having movement away from said seat to open the valve and having movement towards said seat to close the valve, a threaded stem associated with each member and rotatable in opposite directions to effect said movements respectively, a handle applicable selectively to said stems, elements on the valve in the first mentioned conduit cooperating with the handle to permit the application of the handle to the stem only when the valve is closed and to prevent the removal of the handle from the stem when the valve is open, and elements on the valve in the second mentioned conduit cooperating with the handle to permit the removal of the handle from the stem only when the valve effects said predetermined control and to prevent the removal of the handle from the stem when the valve effects a different control.

11. In combination, a valve body having a seat and a threaded extension, a member movable towards and away from said seat to valve closing position and to valve opening position respectively, a stem for said member rotatable in opposite directions to effect said movements of said member, a stem operating handle applicable to and removable from said stem by their non-rotative relative movement when said closure is in a predetermined one of said positions, said handle including a part fixed against rotation thereon and having threads engageable with said threaded extension, when said handle is rotated, to hold the handle against non-rotative movement relative to the stem.

12. In a fluid handling system embodying at least two conduits each of which is provided with a valve arranged to be actuated to positions to respectively provide for flow or to exclude flow through its associated conduit and in which a predetermined sequence of operations of said valves to predetermined relative positions is essential to an operation involving the fluid supplied by the respective conduits, said system being characterized in that each valve comprises a valve body structure having a seat, a closure movable to and away from said seat, and a threaded stem associated with each closure member and rotatable to effect such movements of the closure; a handle applicable selectively to said stems; coacting elements on said handle and each of said body structures to limit the application of the handle to the corresponding stem and the removal of the handle from the stem, said coacting elements being so designed for a given operation that removal from and the application of the handle to each stem is only possible when the stem and associated closure of each valve is in a position such that only the essential predetermined sequence of operations of said closures to said predetermined positions is possible.

WILLIAM C. ROSENBAUM.

REFERENCES CITED

The following references are of record in the file of this patent:

UNITED STATES PATENTS

| Number | Name | Date |
|---|---|---|
| 443,885 | Weil | Dec. 30, 1890 |
| 630,354 | Hufeland | Aug. 8, 1899 |
| 795,027 | Connell | July 18, 1905 |
| 850,740 | Dow | Apr. 16, 1907 |
| 985,469 | Storle | Feb. 28, 1911 |
| 1,681,029 | Cooke | Aug. 14, 1928 |
| 2,011,824 | Pearson | Aug. 30, 1935 |
| 2,029,202 | Shepherd | Jan. 28, 1936 |
| 2,087,220 | Dunn | July 13, 1937 |